Feb. 9, 1960  F. G. BACK  2,924,146
REMOTE CONTROL VARIFOCAL LENS
Filed May 14, 1958  2 Sheets-Sheet 1
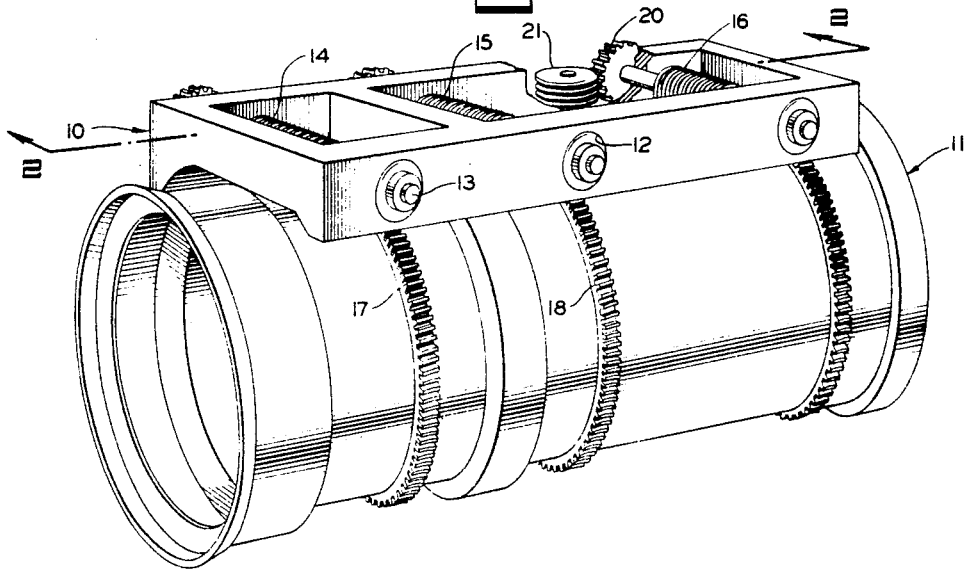
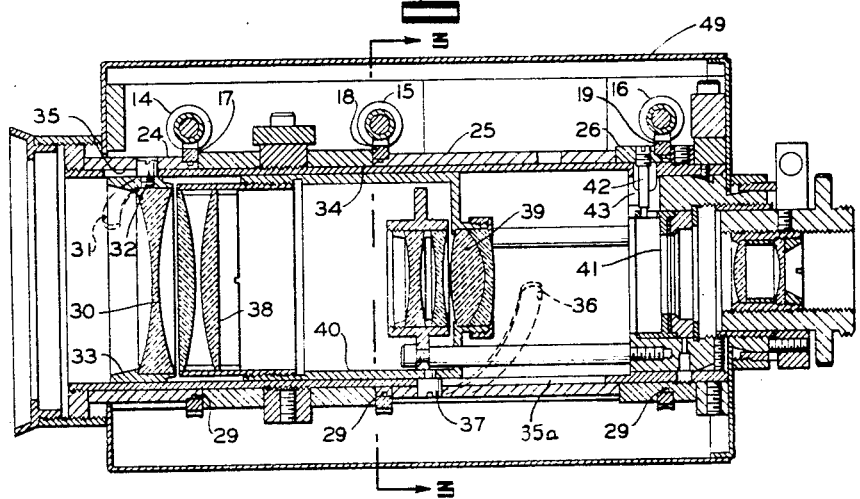
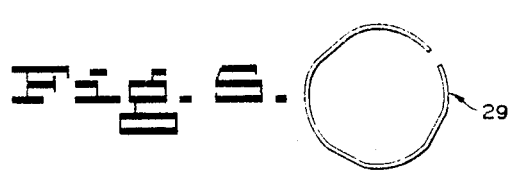
INVENTOR.
FRANK G. BACK
BY Albert F. Kronman
ATTORNEY Feb. 9, 1960    F. G. BACK    2,924,146
REMOTE CONTROL VARIFOCAL LENS
Filed May 14, 1958    2 Sheets-Sheet 2
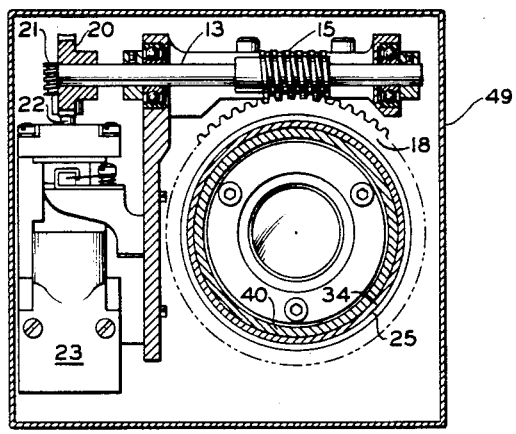
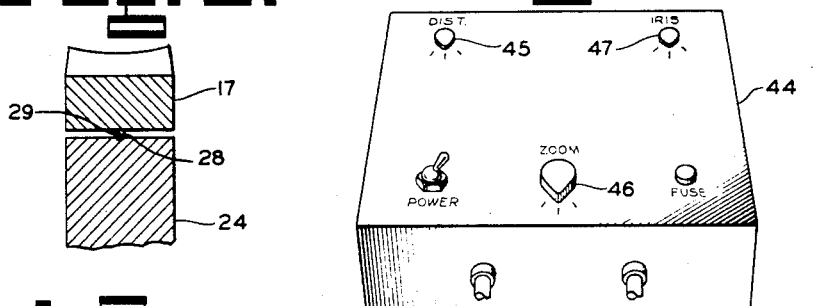
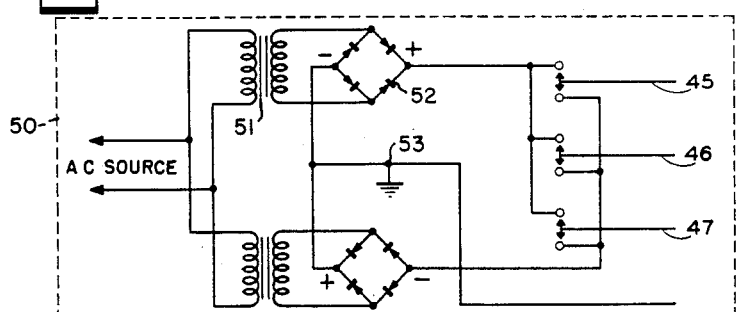
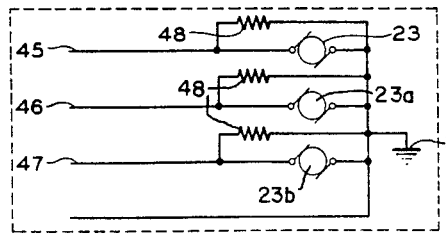
INVENTOR.
FRANK G. BACK
BY
ATTORNEY

United States Patent Office 2,924,146
Patented Feb. 9, 1960

2,924,146

REMOTE CONTROL VARIFOCAL LENS

Frank G. Back, Lattingtown, N.Y.

Application May 14, 1958, Serial No. 735,185

1 Claim. (Cl. 88—57)

This invention relates to vari-focal lens devices and specifically to lenses which may be remotely controlled.

In certain television uses, such as industrial television, it becomes necessary to control the television camera lens at a considerable distance from the vantage point of said lens.

Accordingly, it is an object of the present invention to provide a remotely controlled television vari-focal lens structure capable of continued, trouble free operation.

Another object of the present invention is to provide a remotely controlled vari-focal lense device which will be of compact size.

A further feature of the present invention is to provide a vari-focal lens structure which will lend itself to easy adjustment.

Still another object of the present invention is to provide a vari-focal lens assembly which will respond to rapid changes in the control switching mechanism without injury to the lens assembly.

A feature of the present invention is its use of individual small motors connected to a plurality of worm gear drives.

Another feature of the present invention is its use of over-riding spring clutch means to prevent damage to the drive assembly.

Still another feature of the present invention is its rigid frame construction for maintaining alinement of the various inter-related parts.

In the accompanying drawings, forming a part hereof is illustrated one form of embodiment of the invention, and in which:

Figure 1 is an isometric view showing a complete embodiment of the present invention.

Figure 2 is a longitudinal section taken on line 2—2 in Figure 1.

Figure 3 is a cross-sectional view taken on line 3—3 in Figure 2.

Figure 4 is a somewhat enlarged fragmentary view of the gear ring, adjusting ring and spring clutch assembly for driving the lens elements.

Figure 5 is a view in side elevation showing the spring for the clutch assembly used in the present invention.

Figure 6 is an isometric view of the control box used in conjunction with the present invention.

Figure 7 is a wiring diagram showing the manner in which the various motors are controlled in the operation of the present device.

Referring to Figure 1, 10 indicates a frame having a somewhat L-shaped cross-section to which there is attached a vari-focal lens system 11. The frame 10 is provided with a series of transverse bores 12 within which there are journaled shafts 13. Each of the shafts 13 has secured thereto a worm 14, 15 and 16 respectively. Each of the worms 14, 15 and 16 are in mesh with a corresponding ring gear 17, 18 and 19. A small worm gear 20 is secured to the end of each of the shafts 13. The gears 20 are each driven by a motor 23 (Figure 3) through worm gears 21 secured to the shaft 22 on each of the said motors 23. The motors are carried by the frame 10.

When the motor shafts 22 are rotated by the motors 23, the power is transmitted through the worm gears 21, the worm gears 20 and then from the shafts 13 to the worm gears 14. The worm gears in turn drive the ring gears 17, 18 and 19 on the vari-focal lens assembly 11.

Referring to Figures 2 and 4, it will be seen that the ring gears 17 are carried on the outside of the vari-focal lens system and are coupled to adjusting rings 24, 25 and 26 on the lens barrel. The ring gears 17, 18 and 19 are yieldably connected to the adjusting rings 24, 25 and 26 by means of a spring clutch assembly.

The spring clutch assembly consists of an annular groove 28 which is cut in the adjusting ring and a non-circular spring member 29 carried within the groove 28. The spring 29 takes up the space between the adjusting rings and the ring gears 17, 18 and 19. The spring member 29 creates sufficient friction between the ring gear and the adjusting ring to enable the gear ring to drive the said adjusting ring. However, in the event that the adjusting ring has reached the limit of its travel or that some obstruction occurs in the travel of the adjusting ring the power of the motor drive will over-ride the resistance of the spring 29 and the ring gear will rotate upon the adjusting ring until the power is interrupted.

The power transmitted by worm 14 to the ring gear 17 is transmitted to the adjusting ring 24 which is coupled to the front lens 30 of the vari-focal lens system. The front lens adjusting ring is provided with a helical slot 31 to receive a pin 32 which extends from the lens barrel 33 into the said slot 31. The inner barrel 34 of the vari-focal lens system is cut away as indicated at 35 to permit the longitudinal travel of the pin 32 therein. The rotation of the ring 24 will thus be translated into a linear movement of the front lens 30.

The rotation imparted to the adjusting ring 25 by the ring gear 18, is transmitted as linear motion through the adjusting ring slot 36 by means of a pin 37 on the barrel 40 to the variator 38 and the compensator 39 of the vari-focal lens system. The variator 38 and compensator 39 are coupled together by the barrel 40 which is slidably received in the inner barrel 34 of the vari-focal lens system. The remaining adjusting ring 26 serves to control the iris 41 of the lens system and the rotary power of the adjusting ring 26 is transmitted by means of a pin 42 which is connected to the iris structure 41. The pin 42 is coupled to the adjusting ring 26 and rotates within a slot 43 provided in the inner barrel 34. The longitudinal slot 35a in the barrel 34 permits longitudinal motion of the pin 37 in barrel 34.

The control box 44 shown in Figure 6 is coupled to the motors 23 of the lens system in the manner illustrated by the wiring diagram of Figure 7. The control 45 marked "distance" governs the motor 23 which serves to rotate the adjusting ring 17 to govern the action of the front lens 30. The control 46 marked "zoom" serves to operate the variator 38 and the compensator 39 through motor 23a which drives the ring gear 18. The control 47 marked "iris" enables the operator to open or close the iris as desired through the action of the motor 23b which rotates ring gear 19 and the adjusting ring 26 when driven by the motor 23 connected thereto.

The motors 23, 23a, 23b, as shown in Figure 7, have resistors 48 connected in parallel therewith. The use of resistors 48 in this manner assures a positive and powerful initial starting torque for the motors and a constant drive thereafter for the lens element. The use of individual small motors in this manner permits the various optical elements to be driven with very small motors but with great efficiency. The remainder of the circuit shown in Figure 7, consists of the source of potential 50, the transformers 51, the rectifiers 52, and the ground connections 53.

All of the moving elements of the apparatus are preferably covered by a housing 49 (best shown in Figures 2 and 3). The housing 49 prevents foreign matter from reaching the gears and other operating structures of the device.

By having each of the shafts 13 rigidly mounted within the frame 10 and by the concentric position of the ring gears and adjusting rings a structurally sound dependable device has been provided. In addition, the over riding properties of the ring gear which are possible when the adjustments of any of the lenses reaches its maximum point of travel protects the motors from damage and results in a more immediate response in the event that the motor is reversed. By grouping the motor and controls about the barrel of the vari-focal lens system a great economy in space and weight has been achieved.

Having thus fully described the invention, what is claimed as new and desired to be secured by Letters Patent of the United States, is:

A remotely controllable vari-focal lens device comprising, an axially slidable first barrel, a front lens carried by said barrel, an axially slidable second barrel, a compensator and variator lens carried in spaced relationship by said second barrel, an intermediate barrel around the first and second barrels, a first adjusting ring around the intermediate barrel, a pin engaged by the said ring and extending inwardly of the wall of the first barrel whereby the first ring is coupled to the first barrel, a second adjusting ring around the intermediate barrel, a second pin engaged by said second ring and extending inwardly of the wall of the second barrel whereby the second ring is coupled to the second barrel and a third adjusting ring around the intermediate barrel, an iris assembly, within the intermediate barrel, a third pin carried by the iris and extending therefrom whereby said iris is coupled to the third adjusting means, a ring gear around each of the adjusting rings, an annular groove in the inner surface of the ring gears, a peripheral groove in each adjusting ring opposite the ring gear groove, spring clutch means consisting of a noncircular spring member disposed in the said grooves between the ring gears and adjusting rings whereby said gears are yieldably coupled thereto, a rigid frame carried by the lens barrels, a source of rotary power for each ring gear comprising a motor supported by the frame, spaced shafts journaled within the frame, gear means carried by the shafts to drive the ring gears by means of said motors and a source of potential selectively connected to each of the motors to drive the adjusting rings and operate the vari-focal lens device.

References Cited in the file of this patent

UNITED STATES PATENTS

| | | |
|---|---|---|
| 1,947,669 | Warmisham et al. | Feb. 20, 1934 |
| 2,720,817 | Mills | Oct. 18, 1955 |
| 2,737,082 | Dowling | Mar. 6, 1956 |

FOREIGN PATENTS

| | | |
|---|---|---|
| 1,146,999 | France | May 27, 1957 |